July 20, 1954 — S. E. SHAFFER — 2,684,077
IRRIGATION CONTROL VALVE
Filed Nov. 24, 1950
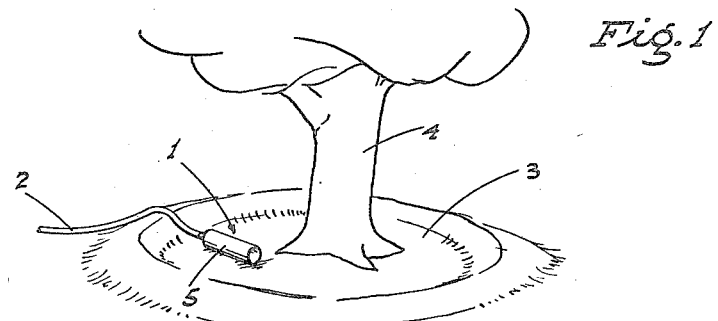
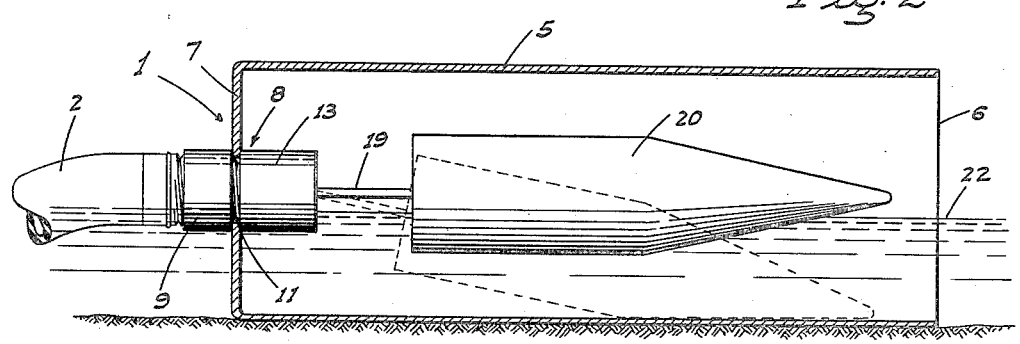
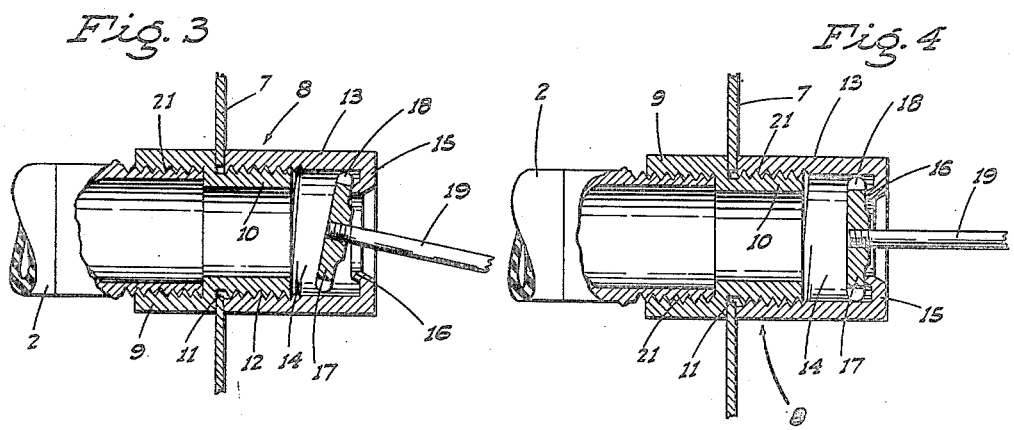
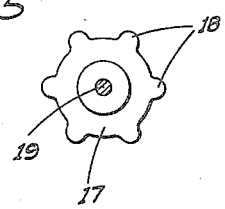
INVENTOR
Stanley E. Shaffer
BY *[signature]*
ATTORNEYS Patented July 20, 1954

2,684,077

UNITED STATES PATENT OFFICE 2,684,077

IRRIGATION CONTROL VALVE

Stanley E. Shaffer, Merced, Calif.

Application November 24, 1950, Serial No. 197,433

3 Claims. (Cl. 137—410)

This invention relates generally to an irrigation control valve.

A major object of the invention is to provide a small, compact, readily portable control valve adapted to couple to the discharge end of a hose and to thereafter automatically shut off the flow of water from the hose upon a predetermined level being reached within the irrigation check or basin in which the device is disposed.

Another important object of the invention is to provide an irrigation control valve, as above, which is novel in that the valve—once closed by float action and upon the water reaching said predetermined level—thereafter remains closed under the pressure in the hose and cannot reopen when said level drops. This is advantageous as it permits of use of the device without requiring close attention by the person in charge.

An additional object of the invention is to provide an irrigation control valve, of the type described, which includes a novel valve structure, in connection with the float, to attain the desired end.

A further object of the invention is to provide an irrigation control valve, as in the preceding paragraph, wherein the float, and valve structure, are disposed in a protective, sleeve-like body which also serves to prevent undue washing of the soil at the point of delivery into the irrigation check or basin.

Still another object of the invention is to provide an irrigation control valve which is designed for ease and economy of manufacture.

It is also an object of the invention to provide an irrigation control valve which is practical and reliable, and yet exceedingly effective for the purpose for which it is designed.

These objects are accomplished by means of such structure and relative arrangement of parts as will fully appear by a perusal of the following specification and claims.

In the drawings:

Fig. 1 is a perspective view of the device as in use.

Fig. 2 is an enlarged elevation of the device with the elongated tubular body in section.

Fig. 3 is an enlarged fragmentary sectional elevation of the valve structure, showing the disc valve in its open position.

Fig. 4 is a similar view, but shows the disc valve in its closed position.

Fig. 5 is an end elevation of the disc valve, detached.

Referring now more particularly to the characters of reference on the drawings, the novel irrigation control valve is indicated generally at 1, being coupled to a hose 2 and lying within the confines of an irrigation check or basin 3, as about the trunk of a tree 4.

The irrigation control valve 1 comprises an elongated tubular body 5 of relatively light weight but sturdy construction; such body being open at its forward end 6, but closed at its inner end 7.

A two-part fitting, indicated generally at 8, extends axially through the closed inner end 7 of the body 5; such fitting including a cylindrical outer body section 9 having a neck 10 which projects through a central opening 11 in the end 7, thence being threaded, as at 12, into the adjacent end portion of an inner cylindrical body section 13.

As so mounted the inner cylindrical body section 13 projects axially into the body 5 from the end 7; such body section 13 having an internal cylindrical valve chamber 14 therein open to the free end of said body section 13.

At such free end the body section 13 is formed with a radially inturned annular flange 15 of limited extent, and an axially inturned annular valve seat 16 extends from the flange 15 rearwardly into the valve chamber 14. As clearly shown in Figs. 3 and 4, there is substantial clearance between the inturned annular valve seat 16 and the adjacent peripheral wall of the chamber 14.

A disc valve, indicated at 17, is disposed in the valve chamber 14, being of only slightly greater diameter than the annular valve seat 16, but is maintained positioned for proper register therewith by means of a plurality of radially projecting nubs 18 on the disc valve 17 in circumferentially spaced relation. The maximum diameter of the disc valve 17, including the nubs 18, is slightly less than the inside diameter of the chamber 14, so that said disc valve may move freely from a canted open position, as in Fig. 3, to a closed position bearing flush against the valve seat 16, as in Fig. 4.

An axial stem 19 is fixed to the disc valve 17 and projects forwardly out of the fitting 8, being attached at its front end to an elongated cylindrical float 20 tapered forwardly for substantially its front half, whereby to permit the float to have greater vertical movement in the body 5 than would otherwise be the case. At its front end the float 20 terminates short of the open end of the body 5, so that such float is not at any time subject to being struck from the outside.

When the device is in use it is disposed substantially horizontal within the irrigation check or basin 3 in the manner shown in Fig. 1; the hose 2 being threaded into the outer end of the fitting 8, as at 21.

The float 20 is normally disposed in a down position, at which time the stem 19 is inclined forwardly and downwardly from the disc valve 16, thus canting the latter to its open position, as in Fig. 3.

As the water flows from the hose 2 through the fitting 8, it escapes about the initially canted or open disc valve 7 and thence flows through the body 5 into the irrigation check or basin 3. The body 5 serves effectively as a diffuser for the water so that the soil about the device is not washed or dug out by the water flow.

As the water level rises in the irrigation check or basin 3 to a certain level, as at 22, the float 20 correspondingly lifts, swinging the disc valve 17 from its canted position to a perpendicular position. The moment that such perpendicular position is reached, the water pressure from the hose 2 forcefully shuts said disc valve against the valve seat 16. In this manner the device is automatically shut off when the water reaches the level 22. Thereafter, as the water level drops, with penetration of the water into the soil, the float 20 will not drop and undesirably open the valve; this for the reason that the water pressure from the hose 2 holds the disc valve 17 against the valve seat 16 with sufficient force to prevent such lowering of the float. The float is of relatively light weight to permit of this result.

The described irrigation valve provides a very practical and convenient-to-use device for the purpose of watering limited areas from a hose, and wherein it is desired to automatically shut off the flow after a predetermined level is reached.

The further feature of the valve remaining closed even after drop of the water level is advantageous from the standpoint of attendance to the device; it being possible for the device to stand unattended for a substantial length of time after it automatically shuts off.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A portable irrigation control valve comprising a rigid cylindrical body open at one end and adapted to rest horizontally on the ground, a fitting mounted on the body axially thereof at its closed end, a valve in the fitting, a valve stem projecting from the valve and disposed axially of the body when the valve is closed, and a float of circular cross section on the outer end of the stem within the body, said float being concentric with the stem and of smaller diameter than the body.

2. In a portable irrigation control valve, a tubular fitting adapted at one end for connection to a water supply hose and having a cylindrical valve chamber therein at the other end, an annular internally facing valve seat on the fitting at said other end, the diameter of the seat being less than that of the interior of the chamber, a valve disc to engage the seat of larger diameter than the seat but of smaller diameter than the interior of the chamber, a float rigid with the valve disc, and circumferentially spaced nubs on and projecting radially out from the disc to maintain the disc centrally located in the chamber.

3. In a portable irrigation control valve, a tubular fitting adapted at one end for connection to a water supply hose and having a cylindrical valve chamber therein at the other end, an annular internally facing valve seat on the fitting at said other end, the diameter of the seat being less than that of the interior of the chamber, a valve disc to engage the seat, a valve stem projecting from and rigid with the valve disc, means to support the fitting when the valve is in use so that the stem extends in a generally horizontally direction, and a float on the outer end of the stem rigid therewith and adapted to raise to close the valve; the weight of the float relative to the area of the valve disc being such that the float will remain in a raised position when not water-supported but when water pressure within the fitting holds the valve closed.

References Cited in the file of this patent

UNITED STATES PATENTS

| Number | Name | Date |
|---|---|---|
| 602,525 | Scott | Apr. 19, 1898 |
| 656,887 | Golibart | Aug. 28, 1900 |
| 805,003 | Clary | Nov. 21, 1905 |
| 1,112,724 | Schneider | Oct. 6, 1914 |
| 1,864,978 | Cottrell | June 28, 1932 |
| 1,969,186 | Russ | Aug. 7, 1934 |
| 2,004,417 | Penn | June 11, 1935 |
| 2,213,955 | De Freitas | Sept. 10, 1940 |
| 2,336,120 | Null | Dec. 7, 1943 |
| 2,358,472 | Owens | Sept. 19, 1944 |
| 2,362,747 | Duke | Nov. 14, 1944 |
| 2,375,806 | Martin | May 15, 1945 |
| 2,441,704 | Jackson | May 18, 1948 |
| 2,512,176 | Shaffer | June 20, 1950 |
| 2,559,046 | Peters | July 3, 1951 |

FOREIGN PATENTS

| Number | Country | Date |
|---|---|---|
| 450,869 | Great Britain | July 27, 1936 |